June 24, 1969     MIYOZI TAKEZAWA     3,451,293

DEEP HOLE DRILLING MACHINE

Filed April 28, 1966     Sheet 1 of 2

MIYOZI TAKEZAWA,
INVENTOR.

BY *Hall + Houghton*

3,451,293
DEEP HOLE DRILLING MACHINE
Miyozi Takezawa, 9—18, Terada-cho, Ibaragi-shi,
Osaka-fu, Japan
Filed Apr. 28, 1966, Ser. No. 546,077
Claims priority, application Japan, Apr. 30, 1965,
40/25,806, 40/34,594; May 1, 1965, 40/34,616,
40/34,617
Int. Cl. B23b 39/10, 47/24
U.S. Cl. 77—32.4                                5 Claims

ABSTRACT OF THE DISCLOSURE

In a deep hole drilling machine of the step fed type, operation of the step feed mechanism for retraction of the drill for the discharge of accumulated chips is initiated in response to the torque exerted on the drill by providing in the drill spindle drive (a) a torque deriving mechanism (b) in the form of differential or planetary type gearing, and associating therewith a torque setting and detecting mechanism (c) controlling and controlled by the mechanism (b), and a coacting safety switch and gear locking mechanism (d) for use while adjusting the setting of the mechanism (c).

---

The present invention relates to a deep hole drilling machine of step feed system.

Generally, when a hole has a small diameter and a large working length is being drilled, the accumulation of chips in the hole becomes greater in proportion to the worked length, so that the torque on the drill is gradually increased. Thus, if the drilling is allowed to continue under such conditions, the drill will finally be damaged due to an excessive amount of torque acting thereon. Accordingly, a hole of small diameter and large working length cannot be produced in a single or continuous operation. As the result, the conventional practice of deep hole drilling is such that when drilling proceeds by a predetermined length, the spindle is once extracted from the hole with quick return motion, at the time of which extraction the chips clogging in the hole are removed therefrom in association with the extracting, whereafter a cutting feed is again imparted to the drill for further drilling of predetermined length, the aforesaid actions being repeated until the completion of the drilling of the intended deep hole. The foregoing is the so-called step feed processing system. In such step feed processing system, the amount of each single cut is determined or set either on a time basis by using a timer or on a length basis by using a limit switch. However, in either case, it is necessary that the operator should determine the amount of the single cut depending upon the quality of the work piece by inference in advance of operation, the determined value being then set by a timer or a limit switch. Thus, the setting of the amount of the single cut requires trouble and experience. Further, when the work piece consists of a lamination of two or more different materials, the amount of the single cut must be set in conformity with one material which may be processed with the highest degree of safety. In this case, however, loss in operation will be involved in drilling the other materials. Further, if the setting of the amount of the cut is erroneous, the drill will be damaged. On the other hand, if the amount of the single cut is too small, loss of operation time will be caused since, where a deeper cut is in fact possible, the drill is quickly returned. In short, with the known step feed system, a reasonable drilling operation is hardly possible.

The present invention provides improvements and eliminates the above-mentioned drawbacks of the known step feed system. A feature of the present invention is that the amount of the single cut is determined by utilizing the torque exerted on the drill during operation, not by using a timer, limit switch or the like, thereby achieving a reasonable and efficient deep-hole drilling operation. Another feature of the invention is that the cutting torque exerted during cutting operation is positively detected and when the cutting torque exceeds an allowable set value an electric signal is issued to cause the quick return motion of the drill, and that the setting of an allowable torque in accordance with the quality of the work piece and drill is rendered dependable and easy. A further feature of the invention is to provide a deep hole drilling machine free from accidents in handling wherein at the time of the setting of allowable cutting torque the idle running of the electric motor is prevented thereby facilitating the setting and wherein at the time of the setting of allowable cutting torque and in association with the locking of the whole gearing mechanism, the electric circuit of the electric motor is simultaneously and automatically electrically locked, thereby precluding the possibility of starting the motor accidentally at the time of the setting. Still a further feature of the invention is that the allowable cutting torque which is best suited to the drill used can be set by using a known torque meter, thereby preventing troubles such as the snap of the drill during operation. Another feature of the invention is to provide a deep hole drilling machine involving no waste of cutting operation wherein the working length of the single cut is automatically determined depending upon the relevant factors such as the quality of the work piece.

While various forms of drill torque detecting mechanisms usable in the present invention may be thought of, as an example thereof a torque detecting mechanism which utilizes a differential gear mechanism is included in the following description for effecting the intended step feed processing according to the invention.

Other features and a fuller understanding of the invention may be had by referring to the following description and claims, taken in conjunction with the accompanying drawing, in which:

FIG. 3 is a longitudinal section taken along line A—A in FIG. 2 while

Figure 1:
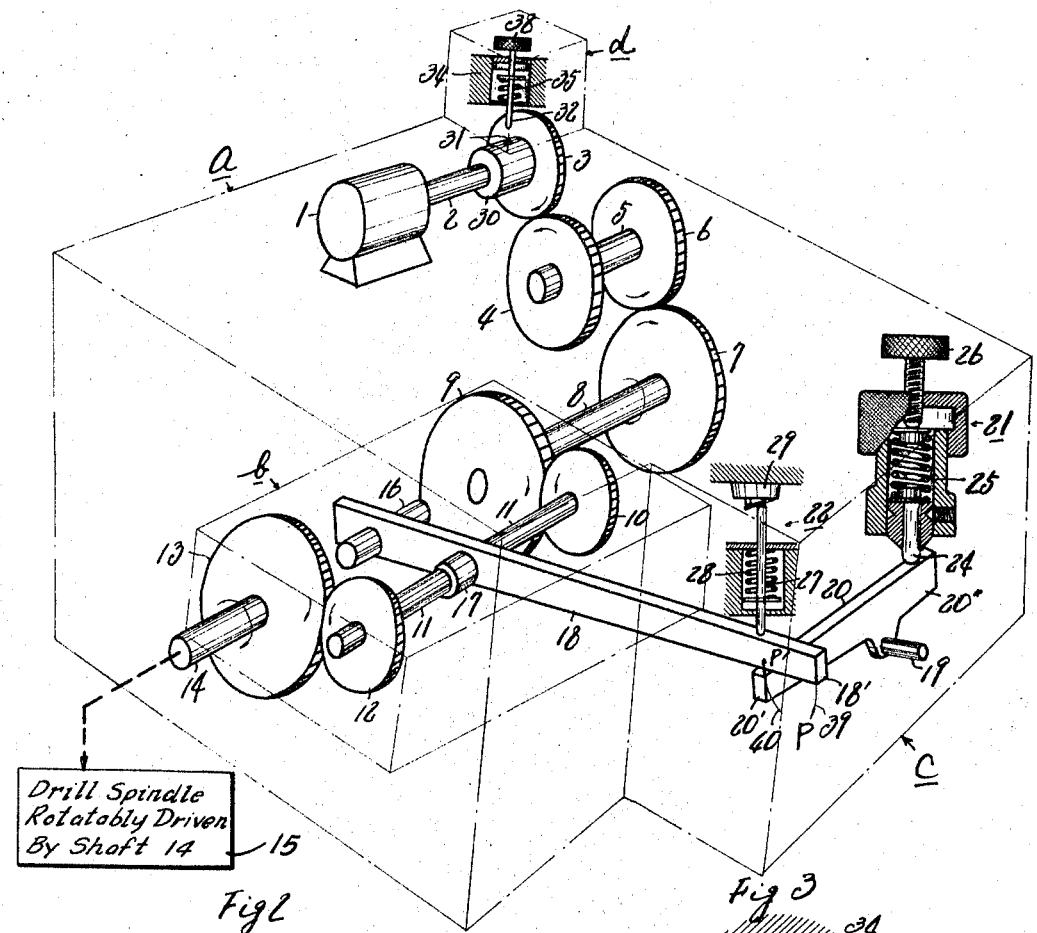
FIG. 1 is a perspective view of the principal structure of a deep hole drilling machine according to the invention comprising, in combination, a spindle driving mechanism, a torque deriving and detecting mechanism, and a locking mechanism for the whole gearing mechanism used at the time of setting of a cutting torque.

Referring to the drawing, a deep hole drilling machine according to the invention consists of a drill spindle driving mechanism a, a torque deriving mechanism b embodied as a differential gear mechanism built in said spindle driving mechanism, a cutting torque setting and detecting mechanism c for previously setting an allowable cutting torque in conformity with the quality of the work piece and the diameter of drill and detecting the torque exerted during operation when the torque exceeds the allowable torque, thereby causing the quick return motion of the spindle, and a locking mechanism d for locking the whole gearing mechanism at the time of the setting of an allowable cutting torque, thereby assuring the dependability and safety of the setting operation. In addition, the spindle feeding mechanism employed in the present invention is of known structure, a detailed explanation thereof is omitted in the specification.

The spindle driving mechanism a is composed of a spindle driving electric motor 1, rotative shaft 2, gears 3 and 4, rotative shaft 5, gears 6 and 7, rotative shaft 8, gears 9 and 10, common shaft 11, gears 12 and 13, and rotative shaft 14 connected to a drill spindle 15. The rotative power of the spindle driving electric motor is transmitted to the rotative shaft 14 through the various members as mentioned above. The torque deriving mechanism b is built in the aforesaid spindle driving mechanism at an intermediate position in the gear train. The mechanism b is composed of two rotative shafts 8 and 14 aligned with and spaced from each other by a predetermined distance, gears 9 and 13 having the same diameter and the same number of teeth and secured to their respective rotative shafts, gears 10 and 12 having the same diameter and the same number of teeth and meshing with said gears 9 and 13, a common rotative shaft 11 for said gears 10 and 12, and a lever 18 located between and at right angles to the gears 8 and 14, pivoted at its root portion by a pivotal shaft 16, rotatably receiving as at 17 the common shaft 11 of the gears 10 and 12, and having its front end 18' projecting forwardly. The front end 18' of the lever 18 of the mechanism b is associated with the cutting torque setting and detecting mechanism c. The mechanism c is composed of a lever 20 crossing the lever 18 at right angles, a pressure setting member 21 imparting a force counteracting the torque to said lever 20, and a member 22 which catches or detects the movement of the lever 18 caused by the torque. The lever 20 is pivoted at its central portion by a pivotal shaft 19 so that its front end is in cross and contact relation to the upper surface of the front end 18' of the lever 18. The member 21 is mounted on the upper surface of the rear end 20" of the lever 20. The member 21 is composed of a bar 24 contacting at its upper end the upper surface of the rear end 20" of the lever 20, a spring 25 permanently pressing down the bar 24, and a screw 26 for adjusting the resiliency of the spring 25 from outside. The member 22 for catching the movement of the lever 18 caused by the torque is composed of a bar 27 contacting at its front end the upper surface of the lever 18, a spring 28 permanently pressing down the bar 27, and a switch 29 adapted to be actuated by the movement of the bar 27. The member 22 also serves as a stopper for the lever 18. Thus, when the bar 27 is raised to its uppermost position against the resiliency of the spring 28, its further upward movement is prevented by the switch 29, so that the further upward movement of the lever 18 is restricted. In this condition, the switch 29 is in its closed position.

Figure 2:
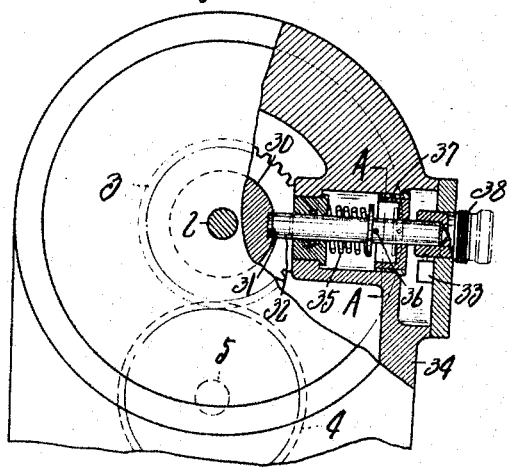
FIG. 2 is an enlarged and detailed view of the locking mechanism for the whole gearing mechanism shown in a position assumed at the time of the setting of a cutting torque.
Figure 3:
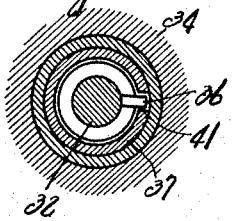
Figure 4:
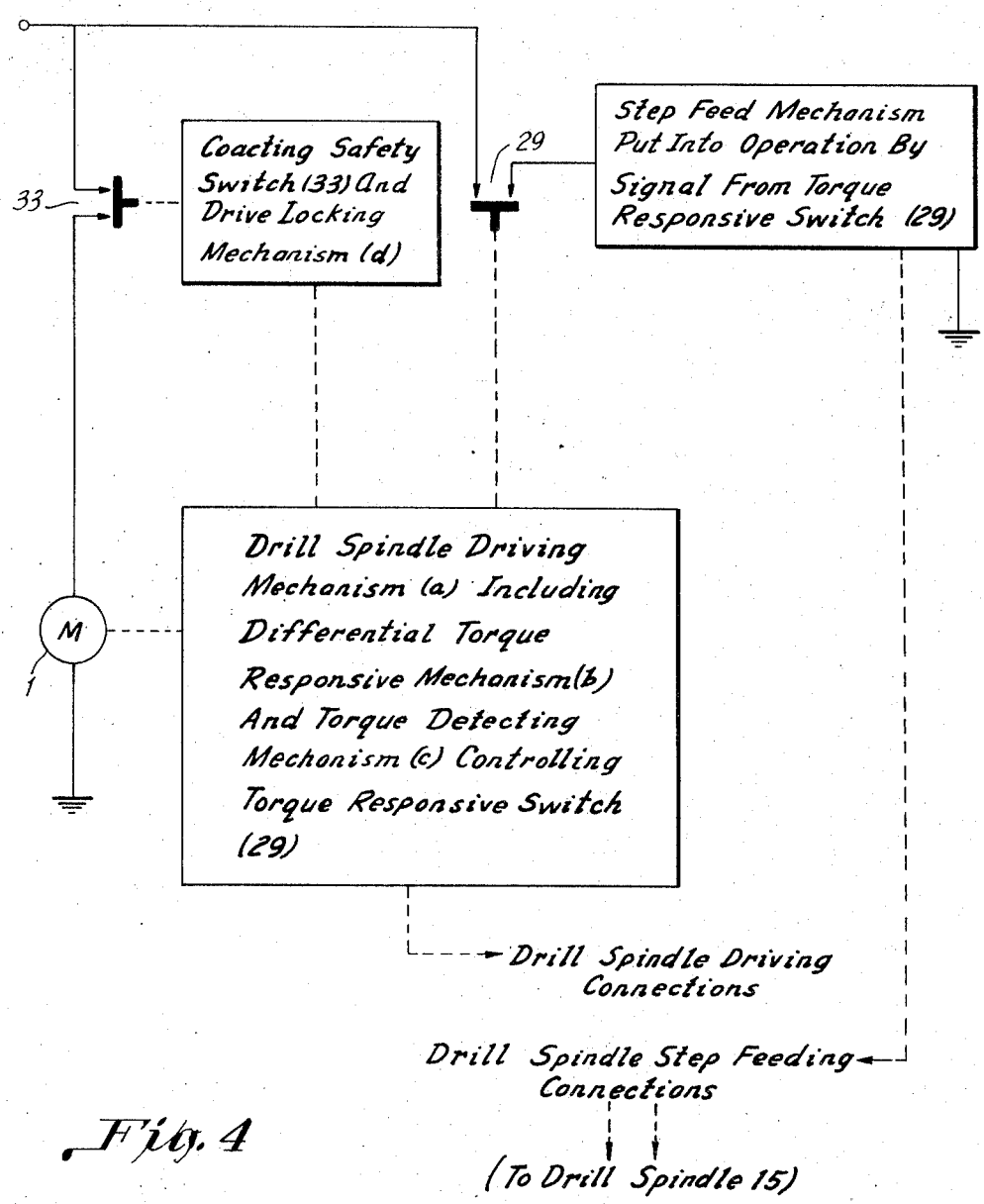
FIG. 4 is a diagrammatic illustration of the electromechanical arrangement.

The locking mechanism d for the whole gearing mechanism, which locks the gears 3–9 and also locks the gears 10–14 against all but the slight rocking movement permitted by the mechanism c, which is used at the time of the setting of an allowable cutting torque will now be described in more detail. The mechanism d, which is associated with the rotative shaft 2 of the electric motor 1, is composed of a small hole 31 bored in the boss 30 of the gear 3, a restricting rod 32 insertable into said small hole 31, and a limit switch 33 (FIG. 2) controlling the motor circuit in association with the movement of the restricting rod. The restricting rod 32 is installed in a casing 34 so as to be opposite the small hole 31 and is normally subjected to an outwardly directed pushing force. As shown in FIG. 3, when a projection 36 for controlling the movement of the restricted rod coincides with a longitudinal groove 41 cut in a metal 37, the said projection 36 falls into the longitudinal groove 41, so that the restricting rod 32 is pushed out by the spring 35 and the front end of the restricting rod 32 is out of engagement with the small hole 31. That is, the whole gearing mechanism is in rotatable condition. In this condition, in order to lock the whole gearing mechanism, as shown in FIG. 2 the restricting rod 32 is pushed in against the resiliency of the resiliency of the spring 35 so as to fit the front end of the restricting rod 32 into the small hole 31. At this time, since the projection 36 is disengaged from the longitudinal groove 41, it is possible to slightly rotate the restricting rod in either a clockwise or a counterclockwise direction to change the positional relation between the projection and the longitudinal groove, thereby to hold hereafter the restricting rod in pushed condition, thus locking the whole gearing mechanism. Further, the limit switch 33 for controlling the motor circuit in association with the movement of the restricting rod is close to the knob 38 of the restricting rod and installed in the casing in such a manner that it is actuated when the restricting rod is brought to the locking position and it opens the circuit when said rod is brought to the releasing position.

With the deep hole drilling machine of the above-mentioned structure, when the motor 1 is driven, a force p in the direction of an arrow 39 acts on the lever 18 of the mechanism b. If the force p is smaller than a force p' pushing up the front end 18' of the lever 18 in the direction of an arrow 40, the lever 18 is held in a fixed position by the member 22 and the rotative shaft 14 is rotating under action of the motor 4. In this condition, when a cutting feed is applied to process a work piece, the torque exerted on the drill spindle 15 and hence on the rotative shaft 14 is gradually increased with the increasing amount of the cut, and consequently the force p on the lever 18 is also increased. Thus, when the force p attains a value to overcome the force p', the lever 18 is moved in the direction of the arrow 39. With the course of this movement, the member 22 functions to actuate the limit switch 29, thereby causing the quick return motion of the drill. Then follows the quick forward feed of the drill, followed by the cutting feed thereof for the second time. The determination of the allowable cutting torque is effected by the mechanism c. This can be done by operating the screw 26 of the mechanism c to properly set the resiliency of the spring 25. At the time of changing the allowable torque it is necessary to lock the whole gearing mechanism by the mechanism d. Thus, after the whole gearing mechanism is locked by the mechanism d to prevent the idle running of the motor, the rotative shaft 14 is manually or otherwise rotated and, while seeing the torque meter, the operator manipulates the screw 26 of the mechanism c to provide a required force p'. In addition, at this time of the locking of the whole gearing mechanism, the motor circuit is opened to prevent accidents, as mentioned above.

From the foregoing description it is seen that according to the invention the torque acting on the drill itself during drilling operation is detected and the amount of a first cut is determined on the basis of the time when the torque on the drill reaches a predetermined set torque (the allowable torque of the drill), whereupon the spindle is quickly returned. Thus, it is made possible to continuously effect stepwise processing without regard to the quality of the work piece and other factors. Further, according to the invention, cutting can be effected every time until the allowable torque is reached with consequent avoidance of loss in cutting operation, and even if the drill encounters a work piece region of different material, the amount of the single cut (the length of the cut) is automatically changed, so that there cannot be any possibility that the drill should break during operation. In short, according to the invention, since the amount of the single cut is determined by calculating the allowable cutting torque of the drill used from factors positively known prior to operation such as the shape of the drill, the rate of cutting feed and the number of revolutions of the drill, the setting of the amount of the single is easier and more dependable than that effected by using a timer, limit switch or the like, thus assuring a reasonable and efficient, deep-hole cutting operation. Further, according to the invention, thanks to the arrangement wherein a shaft 14 connecting the spindle and a shaft 8 associated with the drive side are in opposed relation to each other having gears 13 and 9 of the same diameter and the same number of teeth secured thereto, respectively, and a lever is provided between said shafts so as to be at right angles thereto and having its root portion pivoted, and a shaft 11 for two planetary gears 10 and 12 meshing with the gears 9 and 13 on the shafts 8 and 14 is journalled in the lever, and at the time of the operative connection of the gears a force corresponding to the swing force exerted on said lever is applied to the front end of the lever so that when the cutting torque exerted during drilling operation on the shaft 14 connecting the spindle reaches a value to overcome the force on the front end of the lever, a signal for causing the quick return motion of the spindle is issued by the movement of said lever, it is seen that the torque exerted during cutting operation on the drill can be easily detected, so that by previously adjusting the force on the lever to an allowable torque suited to the drill, stepwise processing can be continuously effected without regard to the quality of the work piece and other factors. Further, according to the invention, since a restricting rod for preventing the idle running of the motor caused by the forcible rotation from the side of the driven shaft 14 is engageably and disengageably provided at suitable portions of the gear operatively connecting mechanism and the motor and since a limit switch 33 for cutting off the motor circuit in association with the idle running preventing action of said restricting rod is provided on said restricting rod, the setting of an allowable cutting torque is made possible and it is also made possible to electrically lock the motor circuit automatically in association with the locking of the whole gearing mechanism, thus positively preventing accidents in handling with no possibility that the motor is accidentially started at the time of the locking of the whole gearing mechanism.

What is claimed is:
1. An improvement in a deep hole drilling machine of the type which comprises
 (a) a drill spindle,
 (b) driving means including a driving motor connected to rotate said drill spindle,
 (c) step feeding means connected to impart return motion, forward feed, and cutting feed to the drill spindle, and
 (d) means connected to said step feeding means for initiating operation thereof,
which improvement comprises
 (e) in said driving means, a gear train for driving said spindle,
 (f) in said initiating means, a switch and means connected to said driving means and to said switch and responsive to the development of a predetermined amount of torque at an intermediate position in said gear train for operating said switch,
 (g) in said torque responsive means, adjusting means for predetermining the amount of torque required to be developed in said gear train for operating said switch, and
 (h) means connected with said motor and with said gear train between said motor and said intermediate position for disconnecting power from said motor and for locking the gear train to prevent rotation thereof while torque is applied through said spindle to said intermediate position during adjustment of said adjusting means.

2. An improvement in a deep hole drilling machine as defined in claim 1, which improvement further comprises
 (i) in said gear train, at said intermediate position, planetary gear means swingable by the development of the predetermined torque thereat,
 (j) said switch being operable by swinging of said planetary gear means, and
 (k) said torque responsive means comprising lever means and spring means engaged therewith for resisting swinging of said planetary gear means to operate said switch until the force exerted by said spring means is overcome and means for adjusting the force exerted on said lever means by said spring means for predetermining the amount of torque required to swing said planetary gear means and operate said switch means.

3. An improvement in a deep hole drilling machine as defined in claim 2, which improvement further comprises
 (l) in said gear train, equal sized gears (9 and 13) spaced from each other and rotatable about a common axis, and having driving connection with said driving motor (1) and with said spindle (15), respectively,
 (m) said planetary gear means drivingly interconnecting said spaced gears (9 and 13) and comprising a first lever located between said spaced gears and swingable about said common axis, said first lever having journalled therein a common shaft (11) having fixed thereto equal sized planetary gears (10 and 12) engaging said spaced gears, respectively.

4. An improvement in a deep hole drilling machine as defined in claim 3, wherein said improvement further comprises
 (n) in said lever means, a second lever engaging the underside of said first lever and pressed thereagainst by said spring means,
 (o) said switch (29) being positioned above said first lever and having an actuating member (27) in engagement with the tip of said first lever.

5. An improvement in a deep hole drilling machine as defined in claim 1, which improvement further comprises
 (p) in said disconnecting and locking means, a motion restricting rod movable to retracted and advanced positions and in its advanced position engaging and preventing rotation of said motor and the gearing leading therefrom to said intermediate position, and a limit switch connected in the circuit of said motor and operated by said rod for cutting off the motor circuit when in its advanced position.

References Cited
UNITED STATES PATENTS
2,562,170  7/1951  Busmeyer _____ 77—32.4 X FRANCIS S. HUSAR, *Primary Examiner.*

U.S. Cl. X.R.
77—32.7